US010417636B2

(12) United States Patent
Pareek et al.

(10) Patent No.: US 10,417,636 B2
(45) Date of Patent: Sep. 17, 2019

(54) PAYMENT VEHICLE WITH ENCRYPTED IMAGE

(71) Applicant: Mastercard International Incorporated, Purchase, NY (US)

(72) Inventors: Ravi Pareek, Pune (IN); Arunmurthy Gurunathan, Pune (IN); Sachin Shrivastava, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 394 days.

(21) Appl. No.: 15/385,034

(22) Filed: Dec. 20, 2016

(65) Prior Publication Data

US 2017/0206527 A1 Jul. 20, 2017

(30) Foreign Application Priority Data

Jan. 19, 2016 (SG) .................. 10201600417 U

(51) Int. Cl.
*G06Q 20/40* (2012.01)
*G06Q 20/38* (2012.01)
*G07F 7/08* (2006.01)

(52) U.S. Cl.
CPC ..... *G06Q 20/4014* (2013.01); *G06Q 20/3829* (2013.01); *G06Q 20/409* (2013.01); *G07F 7/0813* (2013.01); *G06Q 2220/00* (2013.01)

(58) Field of Classification Search
CPC .......... G06Q 20/4014; G06Q 20/3829; G06Q 20/409; G06Q 2220/00; G07F 7/0813
USPC ................... 235/375, 380, 487, 494
See application file for complete search history.

(56) References Cited

U.S. PATENT DOCUMENTS

| 6,321,981 | B1 * | 11/2001 | Ray | G06Q 20/347 235/380 |
| 6,536,665 | B1 * | 3/2003 | Ray | G06Q 20/347 235/379 |
| 7,097,108 | B2 * | 8/2006 | Zellner | G06K 19/06206 235/492 |
| 7,789,311 | B2 * | 9/2010 | Jones | G06K 7/1417 235/487 |
| 2006/0091223 | A1 * | 5/2006 | Zellner | G06K 19/06206 235/492 |

(Continued)

FOREIGN PATENT DOCUMENTS

EP       1154373 A2    11/2001
JP    20100135883 A    5/2000

(Continued)

OTHER PUBLICATIONS

International Search Report and Written Opinion issued by the International Search Authority dated Mar. 21, 2017 in corresponding PCT Application No. PCT/US2017/012434 (11 pages).

*Primary Examiner* — Paultep Savusdiphol
(74) *Attorney, Agent, or Firm* — Buchanan Ingersoll & Rooney PC

(57) ABSTRACT

Described is a payment vehicle for use in initiating a transaction. The payment vehicle includes a body and an image applied to the body. The image includes encrypted data that is readable by an electronic reader to ascertain account details of a payment vehicle user, thereby to initiate the transaction. The image is also visually comparable to the user, or to information produced by the user, to confirm the user's identity.

15 Claims, 12 Drawing Sheets

(56) References Cited

U.S. PATENT DOCUMENTS

| | | | |
|---|---|---|---|
| 2007/0278313 A1* | 12/2007 | Jones | G06K 7/1417 |
| | | | 235/487 |
| 2015/0235225 A1* | 8/2015 | Christie | G07F 7/0813 |
| | | | 705/72 |
| 2016/0210621 A1* | 7/2016 | Khan | G06Q 20/3821 |
| 2016/0260093 A1* | 9/2016 | Tan | G06Q 20/3829 |
| 2017/0039599 A1* | 2/2017 | Tunnell | G06Q 30/0255 |

FOREIGN PATENT DOCUMENTS

| | | |
|---|---|---|
| JP | 20020304590 A | 10/2002 |
| JP | 20100233151 A | 10/2010 |

* cited by examiner

PAYMENT VEHICLE WITH ENCRYPTED IMAGE

TECHNICAL FIELD

The present disclosure relates to payment vehicles for use in, for example, payment transactions.

BACKGROUND

Payment vehicles, such as credit and debit cards, are used in a variety of purchase transactions. For this purpose, each such payment vehicle is provided with a number of credentials including cardholder's name, a card number, expiry date, card verification code (CVC) or card verification value (CVV), and signature. Most cards also include a magnetic stripe into which those credentials are encoded.

When making purchases in-store, the payment vehicle will typically be swiped through a magnetic card reader. The reader reads the encoded credentials from the magnetic stripe, sends them to a card issuer for verification, the card issuer decodes the credentials and cross-references them against a database of cardholder accounts to locate a specific cardholder account. If there are sufficient available funds in the cardholder account to complete the transaction then the payment vehicle is approved for making the transaction. After such approval from the issuer, the cardholder verifies they are the party to whom the payment vehicle belongs by either providing their signature or entering a personal identification number (PIN) into a point-of-sale (POS) terminal.

When making online purchases, a cardholder will enter payment vehicle credentials into a payment gateway or similar. The payment gateway or similar then submits the credentials for verification using the same process as outlined above for in-store purchases. Since the user does not provide a PIN or signature, no information is required other than that which can be ascertained by simple visual inspection of the payment vehicle. Moreover, since the magnetic stripe is not read from the card during online transactions, the payment vehicle need not be physically present when the transaction is made. Thus, a third party having previously acquired the payment vehicle credentials can enter those credentials into a payment gateway or similar, and thereby make fraudulent transactions using the payment vehicle.

It is desirable, therefore, that there be provided a payment vehicle for use in-store, from which payment vehicle credentials cannot be derived for the purpose of making online purchases without the payment vehicle being present.

SUMMARY

The present disclosure provides a payment vehicle for use in initiating a transaction, the payment vehicle comprising:
 a body; and
 an image applied to the body, the image comprising encrypted data,
 wherein the encrypted data is readable by an electronic reader to ascertain account details of a payment vehicle user, thereby to initiate the transaction, and wherein the image is visually comparable to the user, or to information produced by the user, to confirm the user's identity.

The present disclosure further provides a method of performing a transaction, comprising:
 reading encrypted data from a surface of a payment vehicle;
 decrypting the data;
 identifying a user account, based on the decrypted data, from which funds for the transaction can be debited; and completing the transaction using the funds from the user account.

The present disclosure also provides a method of retrieving details, comprising:
 reading encrypted data from a surface of a payment vehicle using a scanner associated with a computing system;
 sending the encrypted data to a server system;
 decrypting the data at the server system;
 identifying a user account stored in a database associated with the server system, based on the decrypted data, the user account comprising user data; and
 sending the user data to the computing system.

The present disclosure still further provides a method for forming a payment vehicle, comprising:
 capturing an image;
 forming an encrypted image by encrypting data into the image, the data comprising at least one of a token, payment vehicle details and cardholder details; and
 applying the encrypted image to a payment vehicle body.

BRIEF DESCRIPTION OF THE DRAWINGS

Some embodiments will now be described by way of non-limiting example only, with reference to the accompanying drawings in which.

DETAILED DESCRIPTION

Figure 1A:
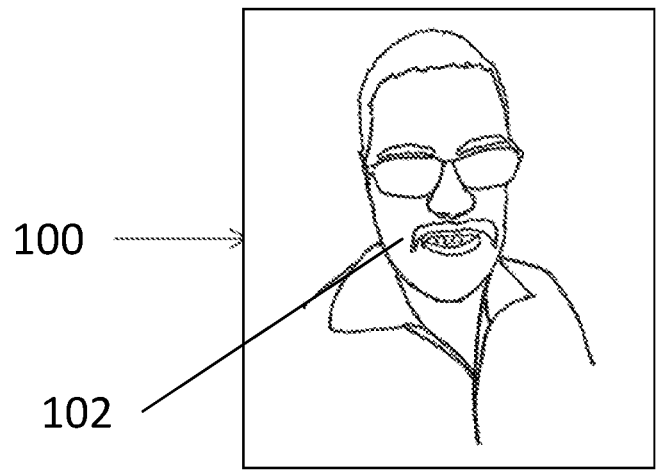
FIGS. 1A and 1B show an image for application to a payment vehicle in raw form (FIG. 1A) and with payment vehicle credentials encrypted into the image (FIG. 1B)

Embodiments of the present invention will be described, by way of example only, with reference to the drawings. Where convenient, like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1A shows an image 100 comprising a picture of a cardholder 102. When a transaction is being made in-store, the picture of the cardholder enables a merchant to visually compare the image 100 to the person making the transaction, to verify that the person making the transaction indeed appears to be the cardholder.

In various embodiments, the image is instead a caricature of the cardholder which may enable a similar visual verification of identity. In further embodiments, the image comprises a picture of the cardholder's signature, thereby enabling traditional signature verification. The image may instead comprise a picture from which no visual verification can take place.

Figure 1B:
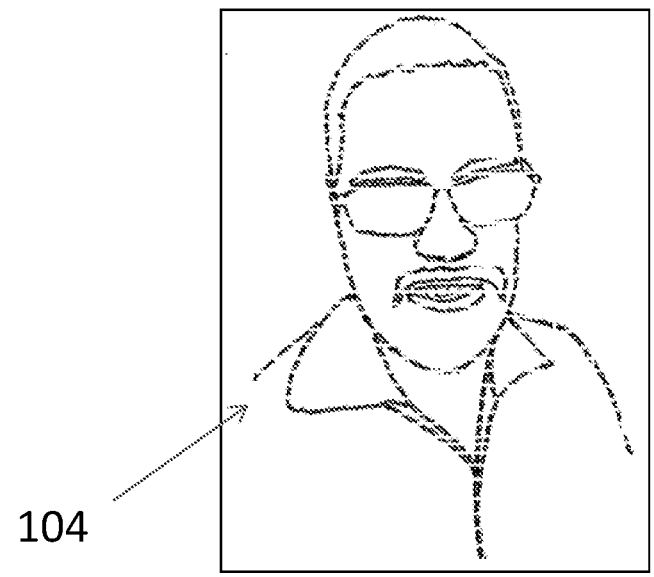

The image 100 is processed in order to generate an encrypted image 104, as shown in FIG. 1B. The encryption results in data being stored in the picture. That data can comprise any desired information, such as details that would otherwise be evident on the face of a standard credit card—for example, cardholder name, card number, expiry date and CVC. Thus the data can be read from the encrypted image to enable standard cardholder account verification protocols to be employed when making transactions. The image 104 may also comprise a token uniquely associating a cardholder with a cardholder profile or account stored on a card issuer's server.

Figure 2A:
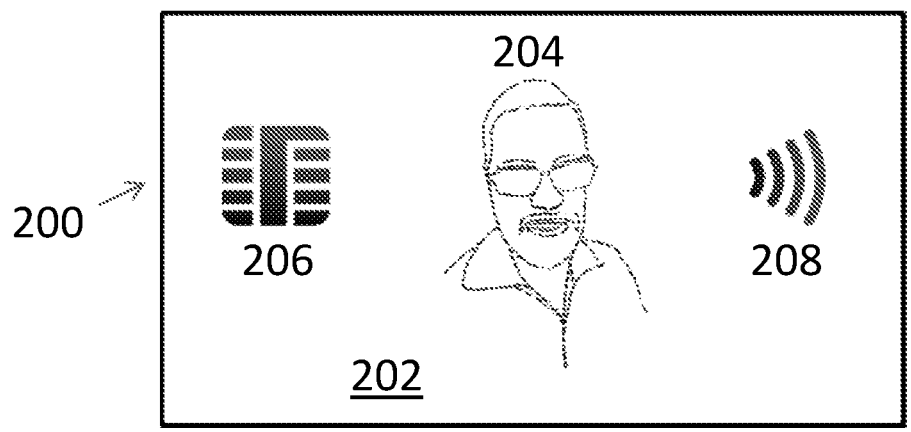
FIGS. 2A and 2B show front and rear sides of a payment vehicle to which the image of FIG. 1B has been applied.

FIG. 2A shows a payment vehicle in the form of a credit card 200. Credit card 200 comprises a body 202 and an image 204 applied to the body 202. The image 204 is presently the same as the encrypted image 104. Thus the image 202, and thereby the credit card 200, comprises encrypted data.

The encrypted data is readable by an electronic reader to ascertain account details of a payment vehicle user, thereby to initiate the transaction. The electronic reader may be a camera or other image capture device.

In some embodiments, the image 204 removes all visible information from the card 200 by which a person may ascertain card credentials or details of the cardholder. As such, it will be difficult for third parties to use the card for online purchases since the card details are not visible. In embodiments where the image 204 is visually comparable to the cardholder (e.g. is an image of the cardholder), or is visually comparable to information produced by the cardholder (e.g. is an image of the cardholder's signature), the only visible information will be that which facilitates visual comparison. Thus third parties will still not be able to ascertain card credentials or details of the cardholder except for their appearance or signature. In this context, "information produced by the cardholder" is generally intended to mean information created by the cardholder at the point of sale, such as a signature.

The credit card 200 further comprises an EMV (Europay, MasterCard and Visa) chip 206. Chip 206 provides secure data transfer from the card to a POS terminal and is a standard technology. While the card 200 comprises chip 206, it will be understood that other payment vehicles may be supplied without it.

The credit card 200 further comprises Near Field Communication (NFC) technology as indicated by the Tap-And-Go® symbol 208. Tap-And-Go® operates off RFID technology and is a standard technology. While card 200 comprises integral NFC technology, it will be understood that other payment vehicles may be supplied without it.

Figure 2B:
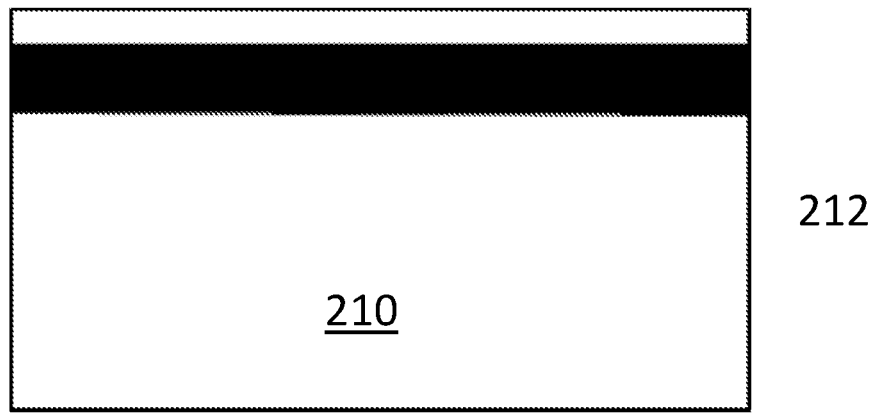

The rear side 210 of the card 200, as shown in FIG. 2B, includes only a magnetic stripe 212. The magnetic stripe 212 is used in the traditional manner. In some embodiments, the cardholder's or user's signature may also be applied to the rear of the card.

Figure 3:
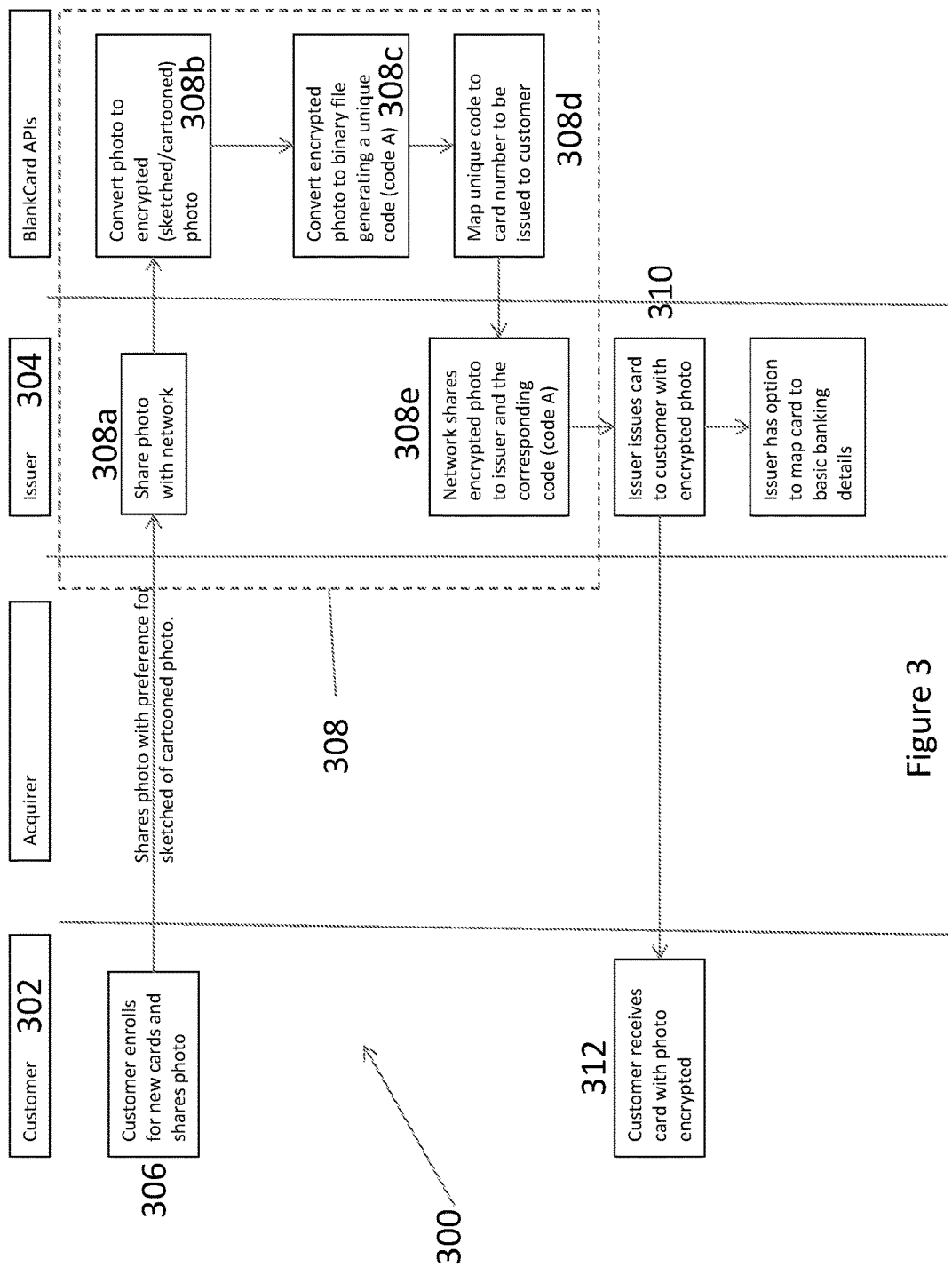
FIG. 3 illustrates a process flow for creating a payment vehicle as shown in FIGS. 2A and 2B.

FIG. 3 provides a process flow 300 for creating a payment vehicle, such as credit card 200. The interaction generally occurs between the customer or party that will become the cardholder 302, and the payment vehicle issuer 304. In a broad sense, the process flow 300 involves:

Step 306: registration and provision of information for a new payment vehicle;

Step 308: encryption of image; and

Step 310: payment vehicle issuance.

In step 306, the customer 302 supplies all requisite information to an issuer, acquirer or other conduit through which the customer 302 can obtain a payment vehicle—"payment vehicle" will be interchangeably referred to in the present context as a "credit card" or "card" though it will be appreciated that other payment vehicles may be created by the same process.

In addition to traditional information, such as personal details (e.g. name, date of birth and gender) and financial details (e.g. salary), the customer supplies or selects an image to be applied to the payment vehicle. Where a photo is to be applied to the payment vehicle, the issuer, acquirer or other conduit may take that photo. The photo may alternatively be taken by the user's camera (e.g. a digital camera, smartphone camera or webcam).

The image is then passed to the issuer 304 for encryption and other processes per step 308. In particular, the issuer 304 shares the photo with their network (308a) which includes various application-programming interfaces (APIs) that:

receive and encrypt the photo per step 308b;
convert the encrypted photo to a binary file per step 308c thereby generating a unique code associated with the image; and
map the unique code to a card number for the card to be issued per step 308d.

It is appreciated that various other methods may be used for the encryption of an image and for associating that image with a card number either directly, or by mutual association with a user account. For example, rather than simply encrypting the photo and then associating the binary file with a card number, the card number itself may be encrypted into the photo. All such methods are intended to fall within the scope of step 308, for encrypting an image.

After encryption, the unique binary file and encrypted image are shared with the issuer 304 per step 308e. Sharing may occur across a network, or may be locally driven by running APIs on a local server with the issuer 304.

Once the issuer 304 receives the encrypted image, the encrypted image is printed onto a payment vehicle such as a credit card, debit card or ATM card. Advantageously, the image can be printed before the card is laminated. Where the cardholder desires a credit card, debit card or ATM card number to be applied to the card, this number can also be applied to the card prior to lamination. This shall remove the need for any embossing of that number.

Once the card is laminated or otherwise sealed to inhibit damage, it is issued to the cardholder per step 310, who receives the card and can activate it for use per step 312.

FIG. 3 also shows an optional step 314 that does not directly relate to card issuance, but instead to providing additional functionality. In particular, payment vehicle details (e.g. encrypted image binary file, card number where applicable, and cardholder name) may be associated with the cardholder's basic banking details such as date of birth, bank account number(s), income band, other cardholder details as necessary, and also details about the financial institution itself such as a Society for Worldwide Interbank Financial Telecommunication (SWIFT) code, Indian Financial System Code (IFSC) and branch number. This enables the payment vehicle to be used as a mechanism by which such basic details can be retrieved for non-banking purposes such as those described with reference to FIGS. 5 and 6.

Figure 4:
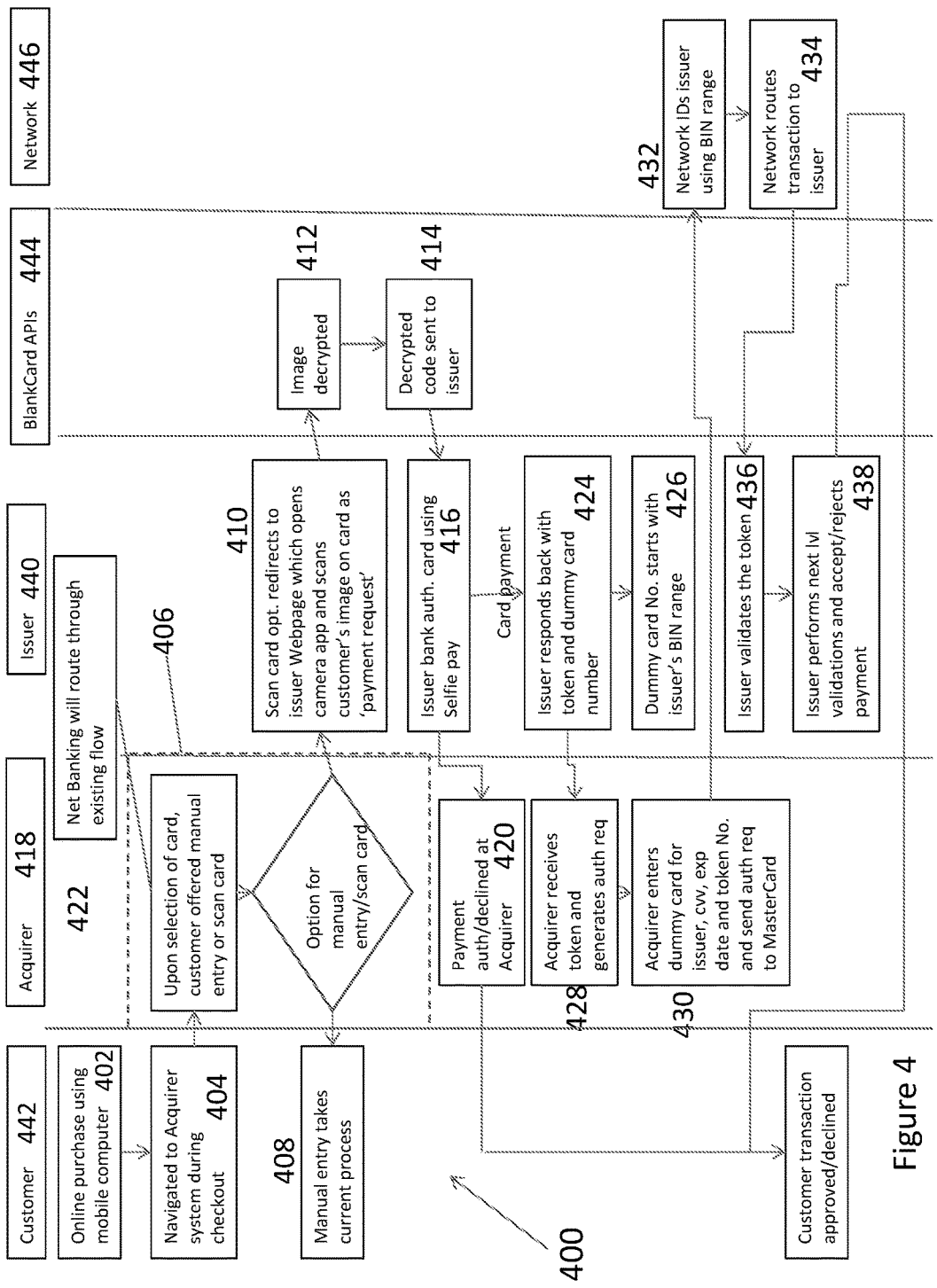
FIG. 4 illustrates a process for making online transactions using a payment vehicle as shown in FIGS. 2A and 2B.

FIG. 4 provides a process flow 400 for performing transactions. There are various types of transaction that can be performed using payment vehicles such as those described above. In general, such transactions are separated into in-store transactions and online transactions.

In process flow 400, at step 402, the customer selects items for purchase in the traditional manner. The customer then proceeds to the checkout at step 404, which may be a POS terminal in-store, or a payment gateway or online portal for online purchases.

Per step 406, there are then two options before the cardholder to enable the cardholder to pay for the transaction to be completed. The first option is manual entry of card details (e.g. into a payment gateway) or scanning the magnetic stripe of the card, per step 408. This type of transaction proceeds to completion or rejection in the traditional manner. The second option is to scan the image of the card, or scan the magnetic stripe and the merchant can then use the image for verification of the cardholder's authenticity, per step 410.

Where the image is to be scanned, an in-store scanner may be used. The scanner may comprise a camera or other image capture device. For online purchases, the payment gateway or portal may, upon selection to enter card details pay by scanning the encrypted image, open a camera application on a computer, or camera app on a mobile device, by which an image of the card can be captured. Then image is then captured and sent to an API for decryption (step 412). The decrypted image file is sent back to the issuer (step 414) and the issuer 304 can then authenticate the user of the card by conducting a file comparison (e.g. with the binary file) or using an image recognition type of image verification such as provided by MasterCard Identity Check, per step 416.

Once the payment vehicle has been verified, the acquirer 418 may accept or decline the transaction (step 420) which completes or terminates the transaction at the POS terminal, payment gateway or portal (step 422).

Alternatively, a card payment process may use a tokenized version of the card credentials, thereby maintaining the privacy of the details encrypted in the encrypted image. In such a process, upon verification of the card the issuer 440 sends dummy details to the acquirer 418 (step 424). The dummy card number may start with a reference identifying the issuer as stipulated in note 426. The dummy details may also comprise one or both of a token that identifies the transaction, and dummy card details. In the present embodiment, the issuer 440 creates dummy card details comprising a reference identifying the issuer, and a token for the acquirer to match the dummy details to the transaction taking place. Once the dummy card details are produced they are sent to the acquirer (step 428). The acquirer then enters the dummy card details along with relevant authentication details such as card expiry date and CVV and sends the details to the network 444. The network 444 then identifies the issuer (step 432), routes the transaction details to the issuers (step 434) whereupon the issuer validates the token and other details of the card (step 436). Upon performing various validation steps, which may include checking a credit or debit balance of the payment vehicle and determining whether there are sufficient funds, or sufficient credit, to fulfil the transaction, the issuer 440 then accepts or rejects the transaction (step 438). The transaction is subsequently accepted or rejected at the customer device 442 (step 422).

Figure 5:
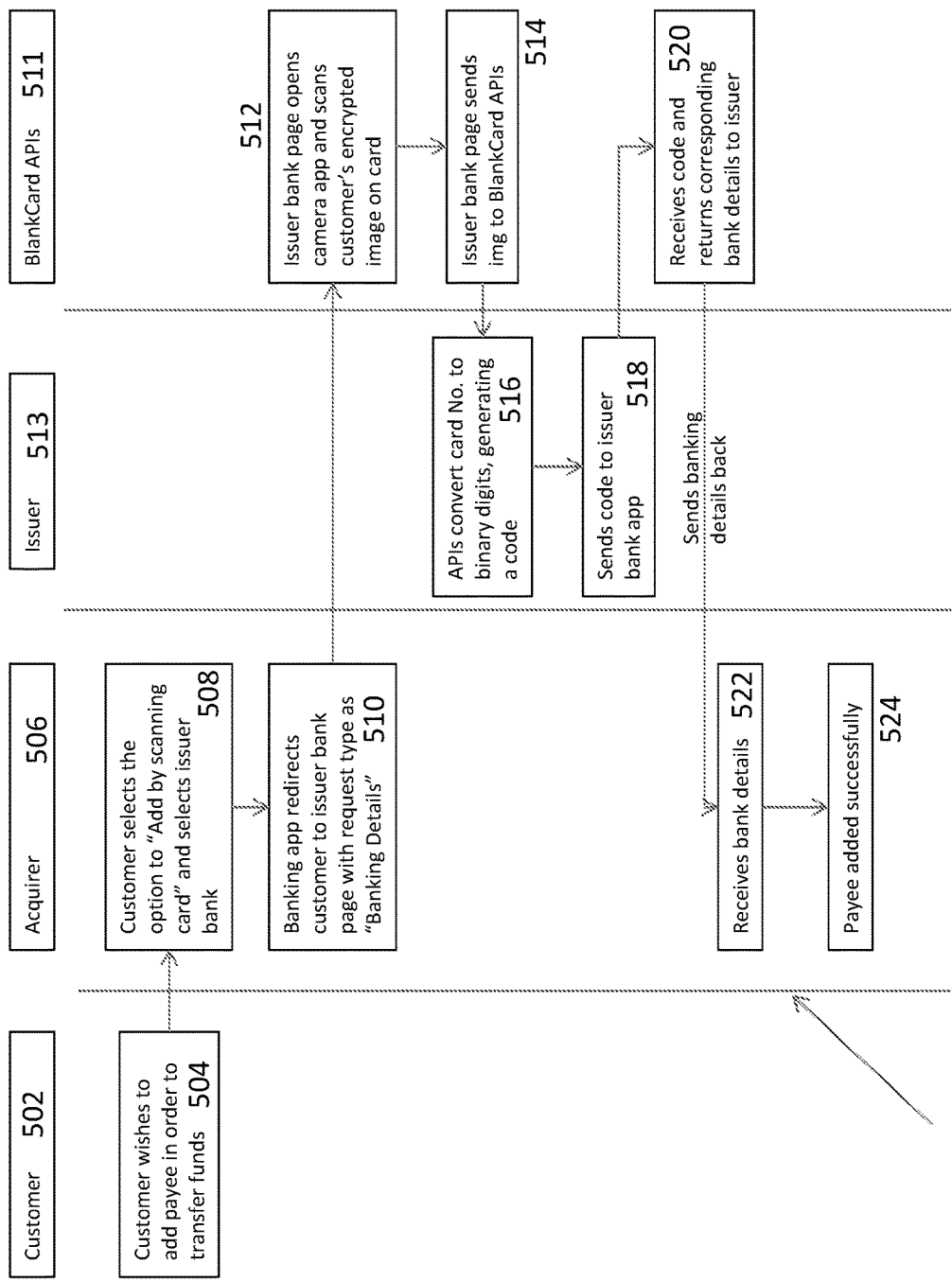
FIG. 5 illustrates a process flow for a person to add a cardholder as a payee.

FIG. 5 shows a process flow 500 by which a party may add a cardholder to their list of payees. In the present instance, the cardholder is the holder of a card comprising an encrypted photo.

In the process flow 500 the party opens a banking or financial services-related app, or web portal, 506 on their mobile device or computer (step 504). The app or portal 506 will typically provide an option whereby the party 502 can manually add the bank account of a cardholder to their list of payees. In the present embodiment, the app or portal 506 also allows the party 502 to select to add a payee by scanning a payment vehicle (step 508).

After selection of the option to add a payee by scanning an image, the app or portal 506 prompts the party 502 to identify the issuer and then redirects the party to an issuer webpage or portal (step 510) of an issuer 511. The issuer webpage or portal opens the camera app on the mobile device or computer 506 and captures an image of the card (step 512). This image is sent to appropriate APIs 513 for decryption (step 514), the APIs then decrypting the image and turning the decrypted image into a binary file (step 516) before returning the binary file to the issuer 511 (step 518) in the same manner as discussed in relation to the card creation process flow 300 of FIG. 3.

Once the issuer 511 receives the binary file it maps the content of that file (which identifies the cardholder) to particular bank details per the mapping generated by optional step 314. The issuer 511 can then identify relevant bank details for uploading to the app or portal 506. So that the issuer 511 knows which details to provide to the app or portal 506, the app or portal 506 may be directed, at step 510, to a particular webpage of the issuer that is dedicated for providing bank details. Alternatively, the app or portal 506 may send an identifier to the issuer 511 that identifies the requester (i.e. identifies the app or portal) of the cardholder's information thereby informing the issuer 511 of the type of information with which it must respond—for example, bank account details.

In an alternative embodiment, the app or portal opens the camera app on the mobile device or computer, from which an image of the card can be captured. To ensure the information captured in that image is routed to the correct issuer, the information captured from the payment vehicle may comprise a first portion of information and a second portion of information. The first portion is interpretable by the mobile device or computer. The second portion is not interpretable by the mobile device or computer. This first portion provides information by which the issuer can be identified. The mobile device or computer can thus identify the issuer by reading the first portion of information. The second, encrypted portion of information can then be sent to the appropriate issuer for processing and verification of the payment vehicle. When sending the second portion of information to the issuer, the app or portal may also send an identifier that identifies the app or portal as the requester of the cardholder's information, thereby informing the issuer of the type of information with which it should respond (e.g. for a requester endeavoring to 'add a payee', the information may be limited to the payee's account number and relevant details to facilitate deposits into that account).

Once the relevant cardholder information—presently banking details (e.g. account number and BSB of a cardholder account)—has been identified, the issuer sends the cardholder information to the app or portal 506, per step 520. The app or portal 506 receives that information (step 522) and adds the information as the banking details of a new payee (step 524).

Figure 6:
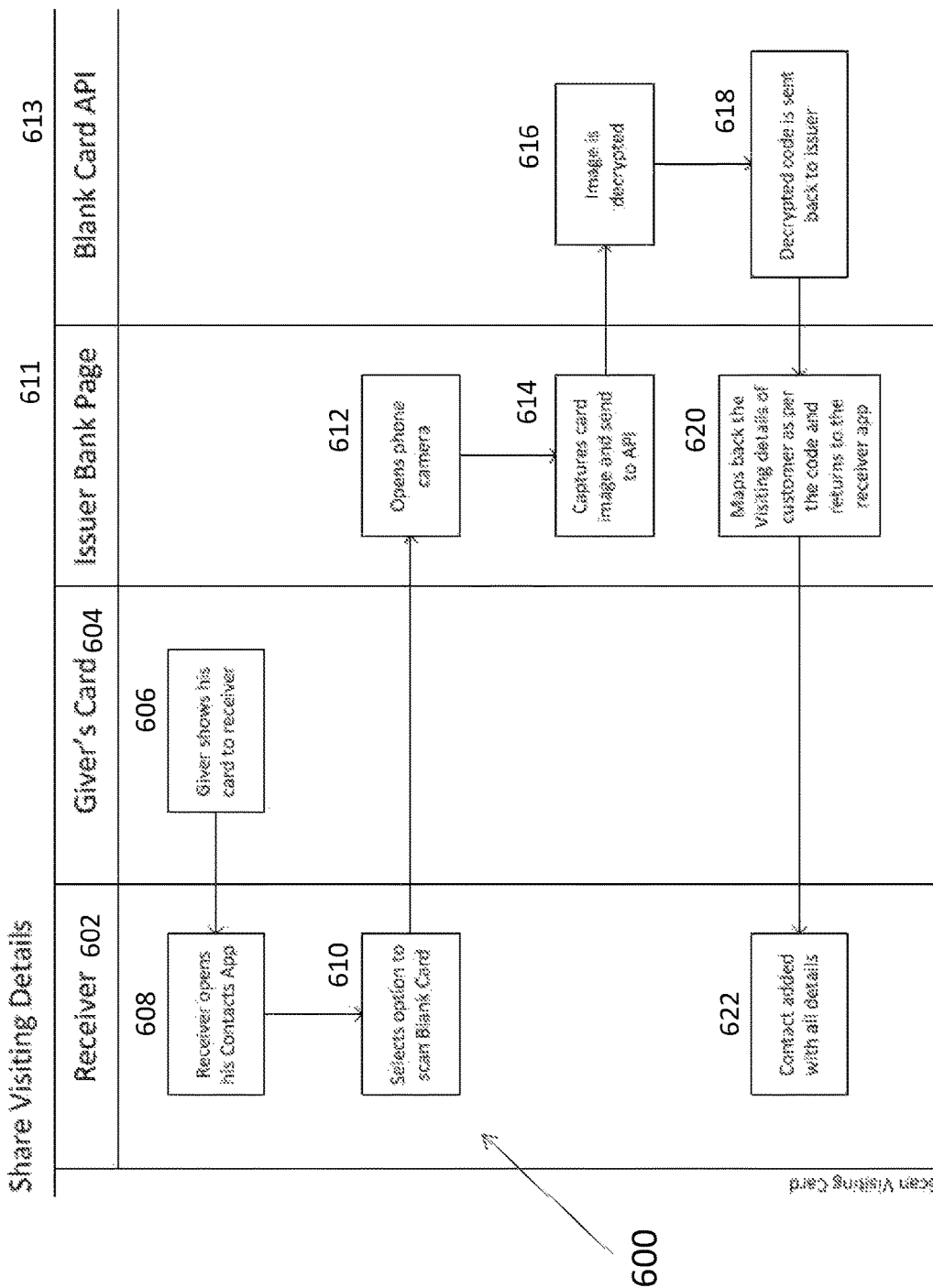
FIG. 6 illustrates a process flow for preparing non-transaction type vehicles based on information retrieval using the payment vehicle of FIGS. 2A and 2B.

FIG. 6 shows the same process as that shown in FIG. 5, with the exception that the app or portal 506 is used to add a payee (e.g. to a virtual wallet or banking application), whereas the app or portal used in FIG. 6 is for adding a contact to a contacts database (e.g. for generating or allocating a visitor card, updating an address book and so forth). Consequently, the app or portal used in FIG. 6 may either redirect to a specific issuer bank web portal or webpage that deals with the provision of contact details, or the app or portal may send an identifier identifying the app or portal as the requester (i.e. that the requester is an app or portal that wishes to obtain contact details rather than, for example, banking details). In either case, the issuer maps the data or information decrypted from the image on the card to relevant cardholder contact details, and sends those details to the app for uploading.

FIG. 6 shows a process flow 600 by which a party (the Receiver 602) may set up a site visit or visiting card. In the present instance, the Giver 604 is the holder of a card comprising an encrypted photo.

In the process flow 600 the Giver 604 present their card to the Receiver 602. The Receiver 602 opens a visitor or contacts management app, or portal, on their mobile device or computer (step 608). The app or portal will typically provide an option whereby the Receiver 602 can manually add the personal details (e.g. name, organization etc.) of a cardholder to their list of payees. In the present embodiment, the app or portal also allows the Receiver 602 to select to add a visitor by scanning a payment vehicle (step 610).

After selection of the option to add a payee by scanning an image, the app or portal prompts the Receiver 602 to identify the issuer and then redirects the party to an issuer webpage or portal of an issuer 611. The issuer webpage or portal opens the camera app on the mobile device or computer (step 612) and captures an image of the card (step 614). This image is sent to appropriate APIs 613 for decryption (step 616), the APIs then decrypting the image and turning the decrypted image into a binary file before returning the binary file to the issuer 611 (step 618) in the same manner as discussed in relation to the card creation process flow 300 of FIG. 3.

Once the issuer 611 receives the binary file it maps the content of that file (which identifies the cardholder) to particular personal details (step 620) per the mapping generated by optional step 314. The issuer 611 can then identify relevant personal details for uploading to the app or portal opened at step 608, to be used in generating a visiting or site visit card (step 622). So that the issuer 611 knows which details to provide to the app or portal, the app or portal may be directed, at step 610, to a particular webpage of the issuer that is dedicated for providing personal details. Alternatively, the app or portal may send an identifier to the issuer 611 that identifies the requester (i.e. identifies the app or portal) of the cardholder's information thereby informing the issuer 611 of the type of information with which it must respond—for example, personal details.

FIGS. 5 and 6 provide two of many examples of the manner in which an encrypted image on a payment vehicle can be used as an easy method for locating particular cardholder details for the purpose of updating financial, as well as non-financial, databases, apps, portals and the like.

Figure 7:
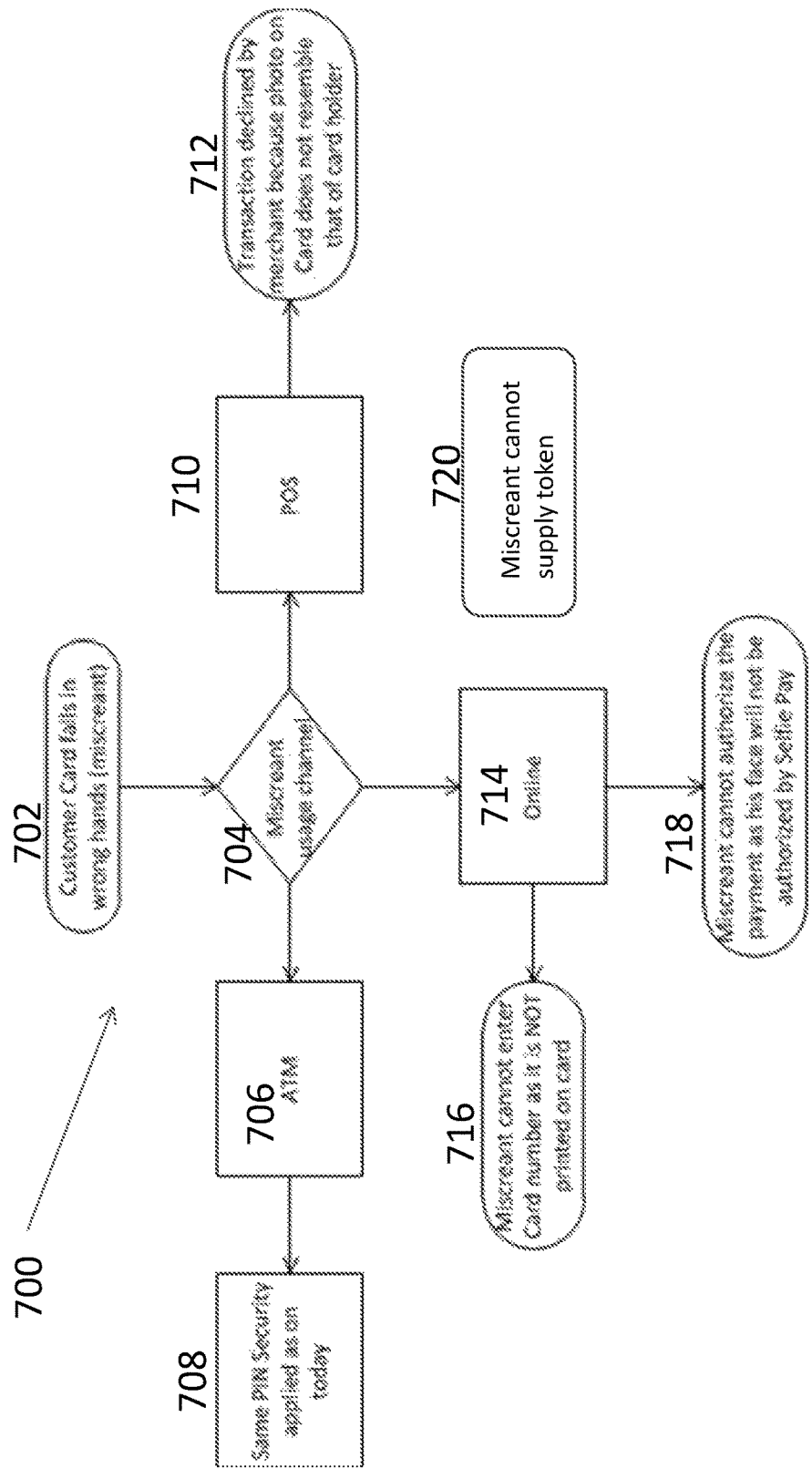
FIG. 7 provides a schematic decision diagram illustrating the ways in which various types of transactions are secured using a payment vehicle as shown in FIGS. 2A and 2B.

FIG. 7 provides a flowchart 700 that runs through various scenarios in which a third party attempts to use a lost or stolen payment vehicle. Initially, a payment vehicle, such as a credit card, debit card or ATM card, falls into the hands of a miscreant third party (step 702). Thereafter, at step 704, the miscreant third party determines how to use the card.

If an attempt is made to use the card at an ATM (step 706), the card is protected by a PIN, ATM camera facial recognition and other technologies (708). In other words, information that is not available on the card itself is used to verify the authenticity of the miscreant third party. Thus the miscreant third party will be prevented from using the card at ATMs.

If an attempt is made to use the card in-store, at a POS terminal (step 710), the merchant will be able to visually compare the miscreant third party with the encrypted photo of the cardholder. If the miscreant third party does not have the same appearance as the cardholder then the merchant has the opportunity to decline the transaction (712).

The miscreant may also attempt to use the card online per step 714. There is a variety of methods that are then used to authorize the user of the card. Firstly, if a payment gateway or portal requires the card number to be supplied then the card cannot be used since it has no visible card number (716). Secondly, if facial recognition (e.g. Selfie Pay®) is used to verify the cardholder's identity, then again the miscreant third party cannot use the card unless their facial features somehow match those of the cardholder (718). Thirdly, an issuer may use a one-time token to authenticate a user—in this process a one-time token is sent to the cardholder's mobile phone and the cardholder must then reproduce the token in order to complete the transaction. The miscreant encounters two issues here: firstly, unless they have also acquired the cardholder's mobile phone and have managed to bypass its security, they will not receive the token and therefore be unable to complete the transaction (720), and; secondly, if the cardholder is in possession of their mobile phone they shall receive a message containing a token and thereby be alerted to the attempted use of the card.

Figure 8:
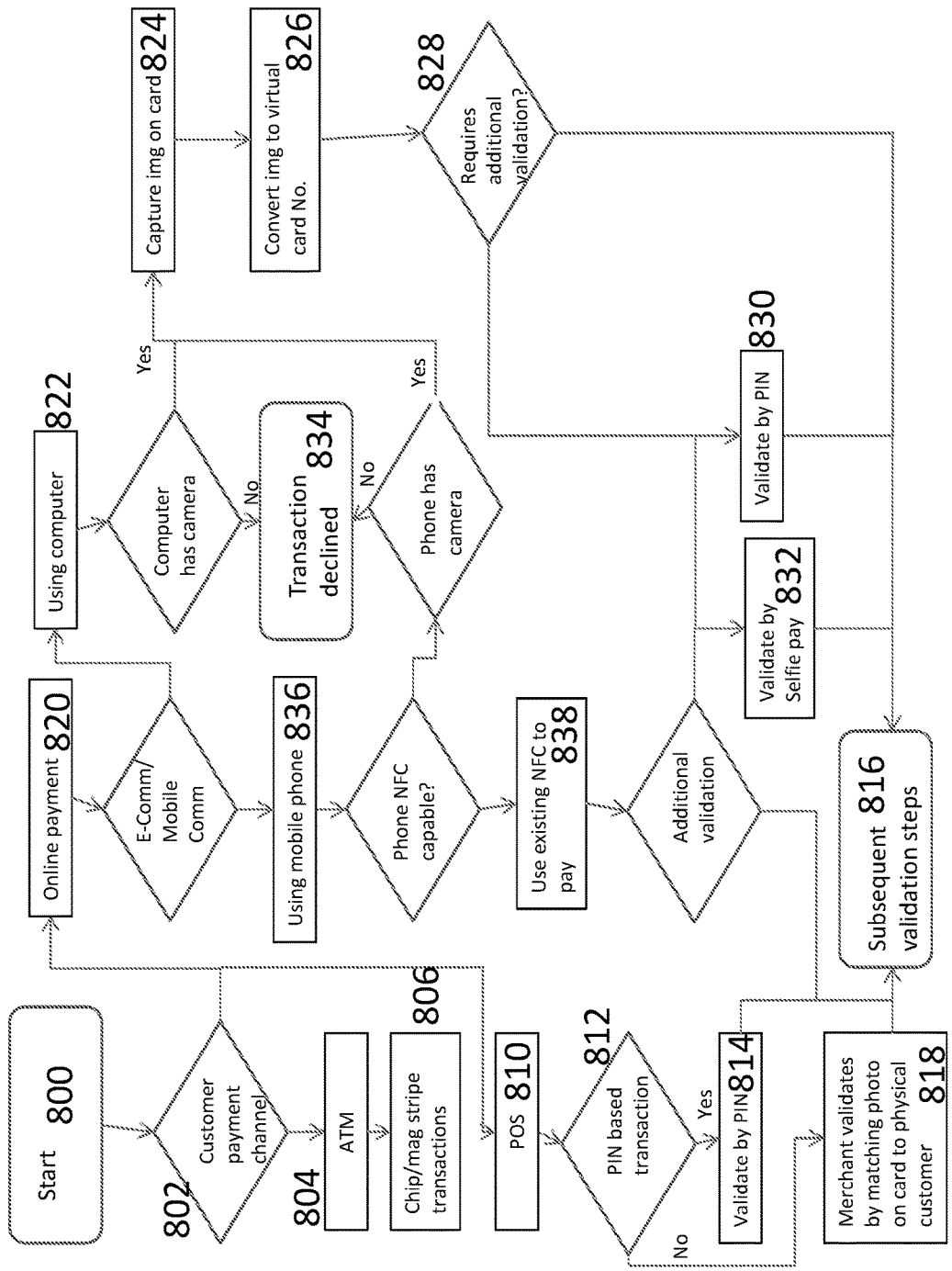
FIG. 8 provides a schematic decision diagram illustrating how various transactions are performed using a payment vehicle as shown in FIGS. 2A and 2B.

While FIG. 7 set out various scenarios in which a miscreant third party may attempt to use a lost or stolen card, FIG. 8 sets out the various processes for legitimate use of such a card or other payment vehicle.

A first process involves usage of a card comprising an encrypted image at an ATM, and comprises steps 800 (the 'Start' of all processes shown), 802, 804 and 806. Step 802 is a decision box in which the cardholder determines the manner in which they intend to use their card. Presently, the decision is to use the card at an ATM (804). The ATM may permit usage of the standard magnetic stripe (806) or another form of identification and authentication such as facial recognition technology and scanning a surface of the card. In the former case, the process complete in the traditional manner after, for example, the cardholder enters a PIN. In the latter case the card holder may verify their identity by having an image captured using a camera in the ATM. Alternatively, the user may scan the image on their card (e.g. using the ATM camera) and verify their identity using either a PIN or by facial recognition from the same ATM camera.

A second process involves the use of a card at a POS terminal. For PIN-based POS transactions, in addition to steps 800 and 802, this second process involves steps 810, 812, 814 and 816. After deciding to use a POS terminal for the transaction (810) the cardholder then determines whether or not to use a PIN (812). After electing to enter a PIN, then PIN is validated (814) and the process moves on for further validation steps if they are necessary (816). For non-PIN-based POS transactions, after electing not to enter a PIN, the merchant visually compares the purchaser with the image on the card and, if there is a match, verifies the authenticity of the cardholder (816), and the process moves on for further validation steps if they are necessary (816).

In a third process the cardholder endeavors to make an online purchase. There is a number of different ways to make online purchases. Once online payment is commenced (820) on an e-commerce platform (e.g. using a computer—822) the provision of a card with an encrypted image provides a number of procedural changes to the traditional payment processes. If the computer has a camera and a payment portal or gateway permits the use of encrypted image payment vehicles, then the computer camera can capture an image of the payment vehicle (824) which is then decrypted and virtual or "dummy" card credentials are then generated (826). After the dummy credentials are generated the computer determines whether additional verification of user identity is necessary (828). If not, the payment is completed. If additional verification is required, then the user may input a PIN or token (e.g. a token sent to the mobile device of the user) per step 830. If still further validation is required then the process proceeds to step 816 and otherwise completes the transaction. As an alternative to PIN/token verification, the cardholder may use facial recognition to verify their identity (832). The facial recognition technology will again make use of the computer camera. If still further validation is required then the process proceeds to step 816 and otherwise completes the transaction.

Notably, if the computer does not have a camera then instead of moving to capture an image of the card (824) the process will instead decline the transaction (834) since the card, in the present instance, does not bear a card number. Consequently, the cardholder cannot manually enter the card credentials and the computer therefore cannot identify the payment vehicle.

If instead of using an e-commerce platform, the online payment process is built on a mobile commerce platform (e.g. a platform implemented on a smartphone—836) there are again a number of methods by which to affect payment.

Notably, in addition to a magnetic stripe, a payment vehicle such as that provided in FIGS. 2A and 2B provides an encrypted image and also an NFC chip. Since online transactions do not make use of magnetic stripes, the cardholder is reliant on image recognition or NFC-based verification processes.

If the mobile device, on which the mobile commerce platform is operating, is not NFC enabled then the cardholder must proceed with image recognition verification. If the mobile device has no camera to facilitate capturing of images then the transaction is declined and the process completes (834) If the mobile device comprises a camera then steps 824, 826, 828, 830, 832 and 816 are followed in the same manner as discussed above with the exception that the camera used is that of the mobile device rather than being that of a desktop computer or terminal.

If the mobile device, on which the mobile commerce platform is operating, is NFC enabled then the cardholder can proceed with NFC verification. If, after reading the NFC chip on the card (838) no additional verification is required in order to confirm the identity of the cardholder, then the transaction is processed and the process completes. If additional verification is required, then the cardholder may elect to use facial recognition technology as discussed above (step 832) or PIN/token validation (830).

Figure 9:
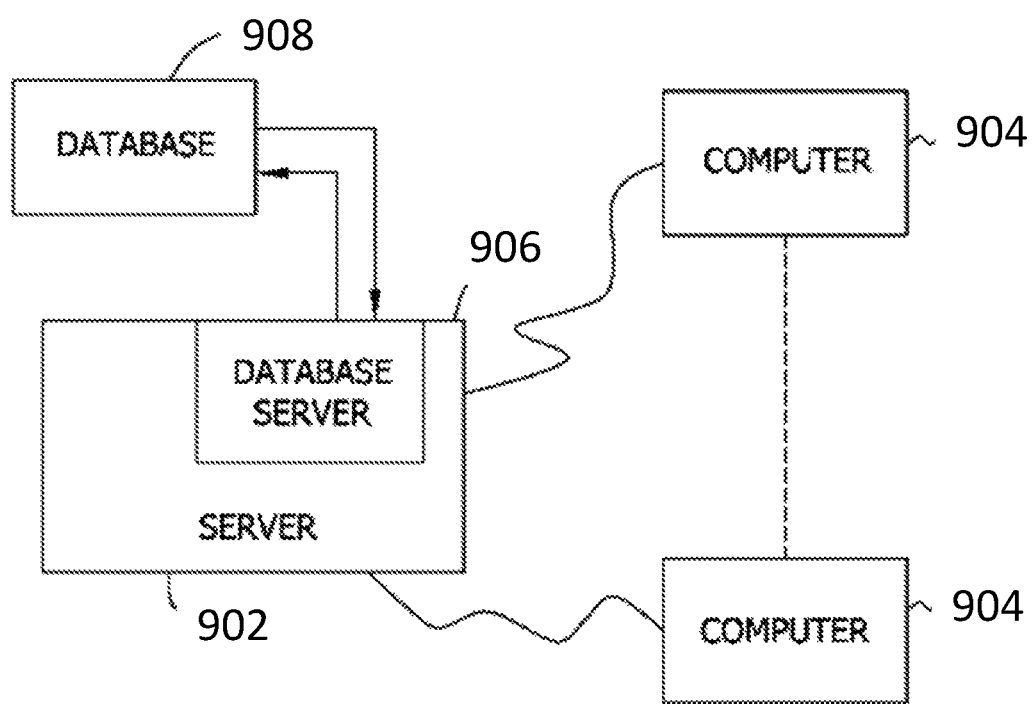
FIG. 9 is an expanded block diagram of an exemplary embodiment of a server architecture of a computer system for determining a fruition score.
Figure 11:
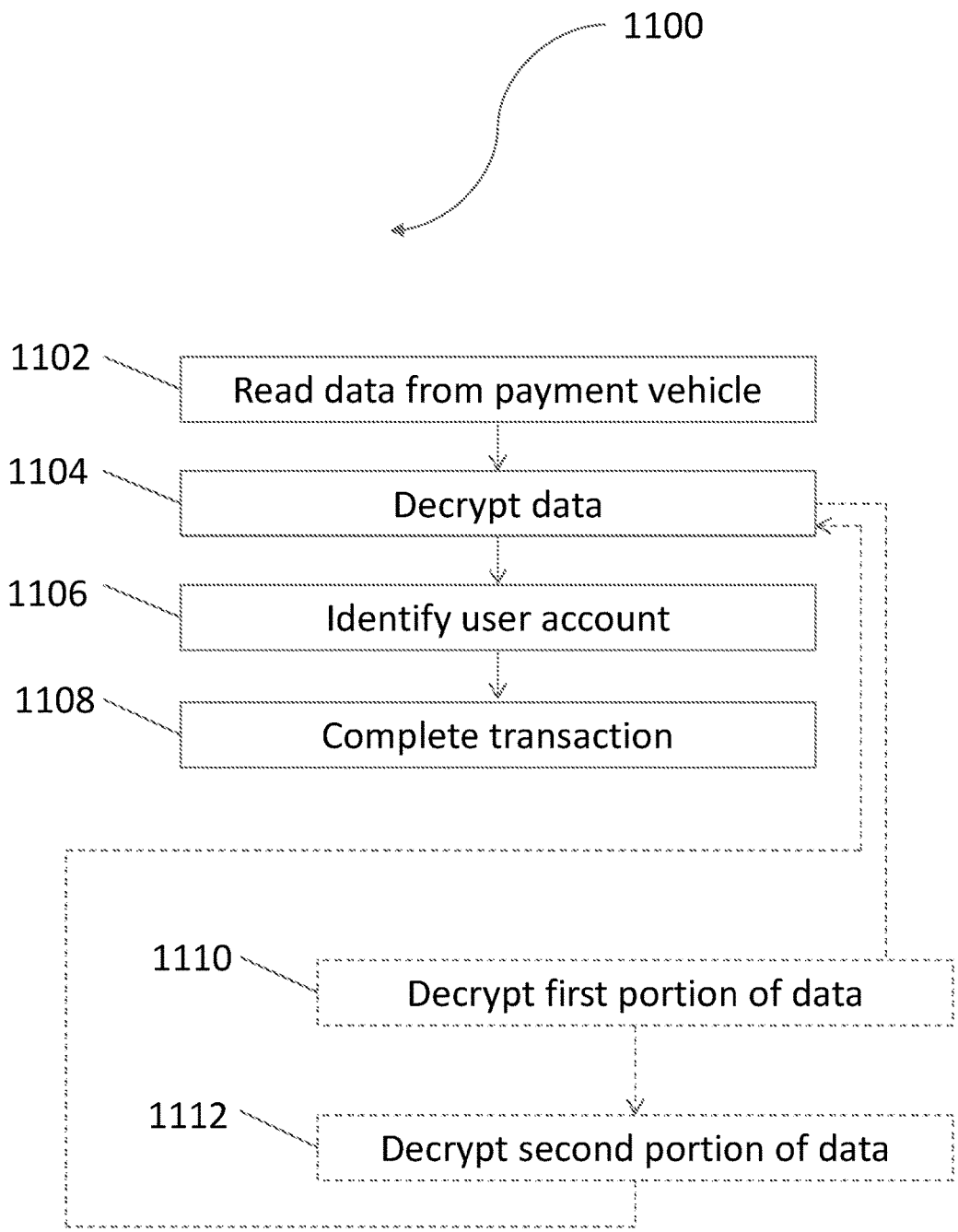
FIG. 11 illustrates a method for performing a transaction.
Figure 12:
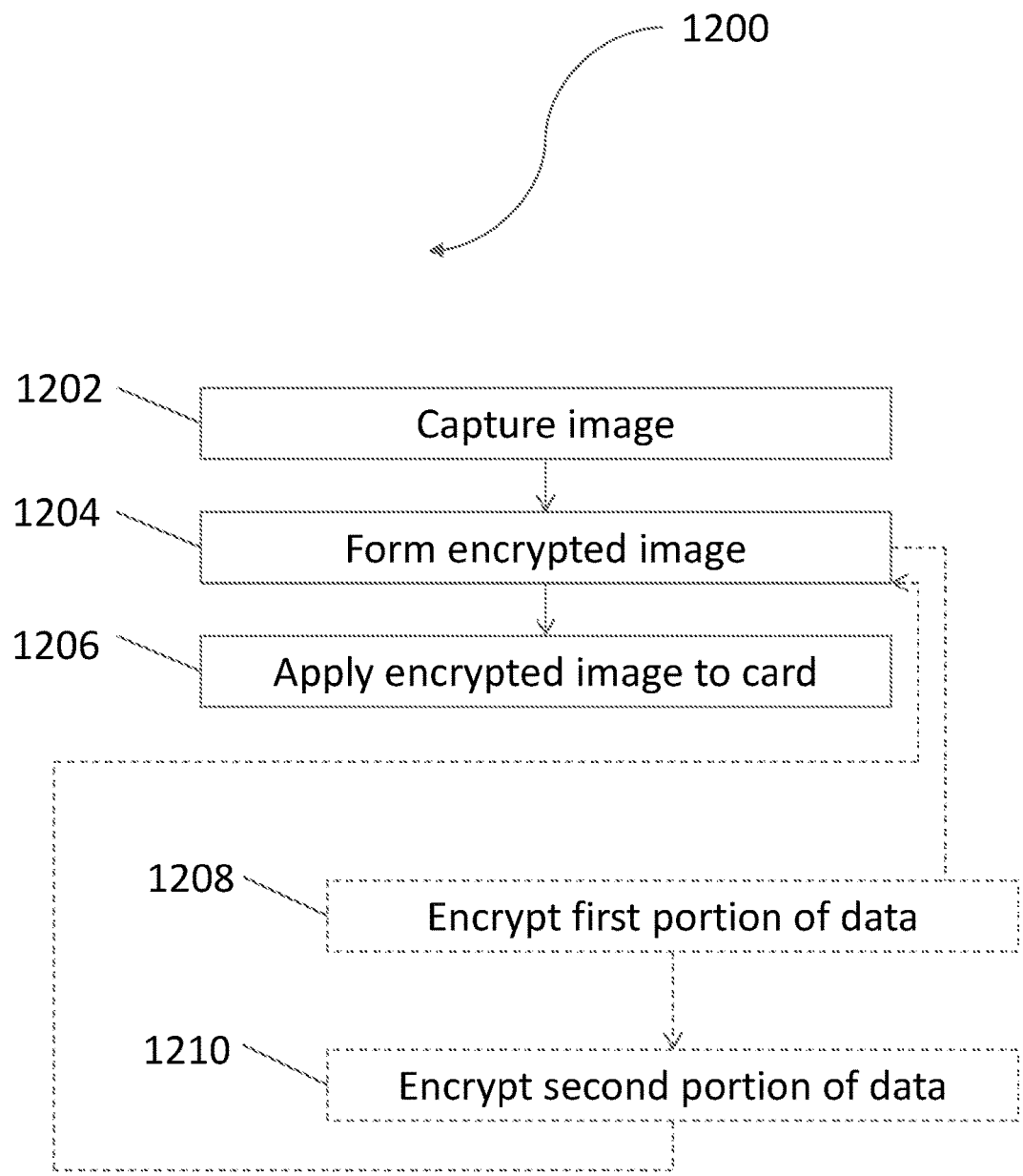
FIG. 12 illustrates a method for forming a payment vehicle.

FIG. 9 shows a schematic of a network-based system 900 for performing a transaction (as shown in FIG. 11) and/or forming a payment vehicle (as shown in FIG. 12) according to embodiments of the invention. The system 900 comprises a computer 902, one or more databases 904a . . . 904n, a user input module 906 and a user output module 308. Each of the one or more databases 904a . . . 904n are communicatively coupled with the computer 902. The user input module 906 and a user output module 908 may be separate and distinct modules communicatively coupled with the computer 902. Alternatively, the user input module 906 and a user output module 908 may be integrated within a single mobile electronic device (e.g. a mobile phone, a tablet computer, etc.). The mobile electronic device may have appropriate communication modules for wireless communication with the computer 902 via existing communication protocols.

The computer 902 may comprise: at least one processor; and at least one memory including computer program code; the at least one memory and the computer program code configured to, with at least one processor, cause the computer at least to: (step 1102) read data from a surface of a payment vehicle; (step 1104) decrypt the data; (step 1106) identify a user account, based on the decrypted data, from which funds for the transaction can be debited; and (step 1108) complete the transaction using the funds from the user account.

Step 1102 may be performed by reading a first portion of data and a second portion of data. Step 1102 may further comprise determining details of at least one of a cardholder and a card issuer from the first portion of data (step 1110). Moreover, Step 1106 may involve using the details to identify a cardholder account in a server system of an issuer.

Wherein Step 1102 involves reading a first portion of data and a second portion of data, Step 1104 may involve decrypting the second portion of data (step 1112).

The computer 902 may also, or alternatively, comprise: at least one processor; and at least one memory including computer program code; the at least one memory and the computer program code configured to, with at least one processor, cause the computer at least to: (step 1202) capture an image; (step 1204) form an encrypted image by encrypting data into the image, the data comprising at least one of a token, payment vehicle details and cardholder details; and (step 1206) apply the encrypted image to a payment vehicle body.

Step (step 1204) may involve forming an encrypted image comprises encrypting a first portion of the data (step 1208) and separately encrypting a second portion of the data (step 1210). Similarly, the encrypting process of Step (step 1204) may include encrypting a first portion of the data and separately encrypting a second portion of the data comprises encrypting the first portion and the second portion using different encryption algorithms. In this sense, encryption of the first portion of data may involve formatting the data to facilitate incorporation into an image whereas encryption of the second portion of data may involve encrypting that data using an encryption key to hide the second portion of data, and then formatting that data for incorporation into the image.

The various types of data, and inter alia the processes for reading and decrypting that data, can be stored on a single database (e.g. 904a), or stored in multiple databases (e.g. wallet credentials are stored on database 904a, payment vehicle credentials are stored on database 904n, etc.). The databases 904a . . . 904n may be realized using cloud computing storage modules and/or dedicated servers communicatively coupled with the computer 902.

Figure 10:
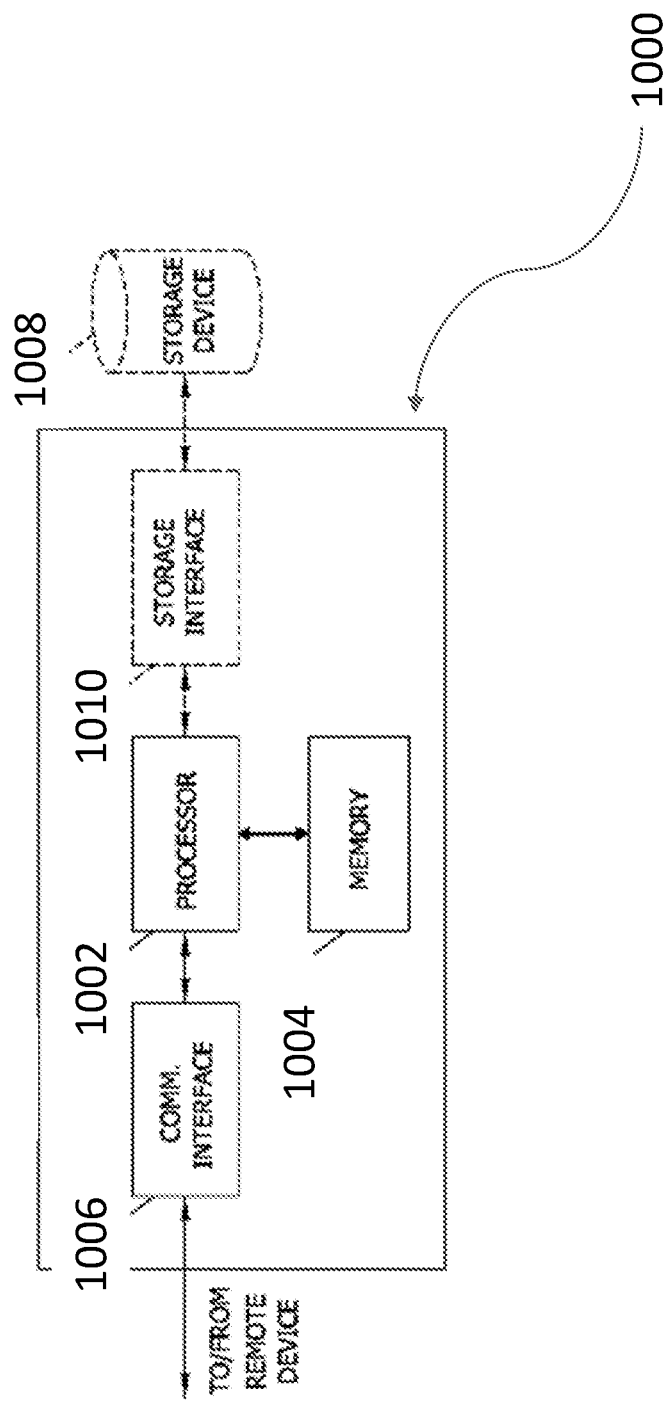
FIG. 10 illustrates an exemplary configuration of a server system shown in FIG. 9.

FIG. 10 depicts an exemplary computer/computing device 1000, hereinafter interchangeably referred to as a computer system 1000, where one or more such computing devices 1000 may be used to facilitate execution of the above-described methods. In addition, one or more components of the computer system 1000 may be used to realize the computer 902. The following description of the computing device 1000 is provided by way of example only and is not intended to be limiting.

As shown in FIG. 10, the example computing device 1000 includes a processor 1004 for executing software routines. Although a single processor is shown for the sake of clarity, the computing device 1000 may also include a multi-processor system. The processor 1004 is connected to a communication infrastructure 1006 for communication with other components of the computing device 1000. The communication infrastructure 1006 may include, for example, a communications bus, cross-bar, or network.

The computing device 1000 further includes a main memory 1008, such as a random access memory (RAM), and a secondary memory 1010. The secondary memory 1010 may include, for example, a storage drive 1012, which may be a hard disk drive, a solid state drive or a hybrid drive and/or a removable storage drive 1014, which may include a magnetic tape drive, an optical disk drive, a solid state storage drive (such as a USB flash drive, a flash memory device, a solid state drive or a memory card), or the like. The removable storage drive 1014 reads from and/or writes to a removable storage medium 1044 in a well-known manner. The removable storage medium 1044 may include magnetic tape, optical disk, non-volatile memory storage medium, or the like, which is read by and written to by removable storage drive 1014. As will be appreciated by persons skilled in the relevant art(s), the removable storage medium 1044 includes a computer readable storage medium having stored therein computer executable program code instructions and/or data.

In an alternative implementation, the secondary memory 1010 may additionally or alternatively include other similar means for allowing computer programs or other instructions to be loaded into the computing device 1000. Such means can include, for example, a removable storage unit 1022 and an interface 1040. Examples of a removable storage unit 1022 and interface 1040 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1022 and interfaces 1040 which allow software and data to be transferred from the removable storage unit 1022 to the computer system 1000.

The computing device 1000 also includes at least one communication interface 1024. The communication interface 1024 allows software and data to be transferred between computing device 1000 and external devices via a communication path 1026. In various embodiments of the inventions, the communication interface 1024 permits data to be transferred between the computing device 1000 and a data communication network, such as a public data or private data communication network. The communication interface 1024 may be used to exchange data between different computing devices 1000 which such computing devices 1000 form part an interconnected computer network. Examples of a communication interface 1024 can include a modem, a network interface (such as an Ethernet card), a communication port (such as a serial, parallel, printer, GPIB, IEEE 1393, RJ45, USB), an antenna with associated circuitry and the like. The communication interface 1024 may be wired or may be wireless. Software and data transferred via the communication interface 624 are in the form of signals which can be electronic, electromagnetic, optical or other signals capable of being received by communication interface 1024. These signals are provided to the communication interface via the communication path 1026.

As shown in FIG. 10, the computing device 1000 further includes a display interface 1002 which performs operations for rendering images to an associated display 1030 and an audio interface 1032 for performing operations for playing audio content via associated speaker(s) 1034.

As used herein, the term "computer program product" may refer, in part, to removable storage medium 1044, removable storage unit 1022, a hard disk installed in storage drive 1012, or a carrier wave carrying software over communication path 1026 (wireless link or cable) to communication interface 1024. Computer readable storage media refers to any non-transitory, non-volatile tangible storage medium that provides recorded instructions and/or data to the computing device 1000 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 1000. Examples of transitory or non-tangible computer readable transmission media that may also participate in the provision of software, application programs, instructions and/or data to the computing device 1000 include radio or infra-red transmission channels as well as a network connection to another computer or networked device, and the Internet or Intranets including e-mail transmissions and information recorded on Websites and the like.

The computer programs (also called computer program code) are stored in main memory 1008 and/or secondary memory 1010. Computer programs can also be received via the communication interface 1024. Such computer programs, when executed, enable the computing device 1000 to perform one or more features of embodiments discussed herein. In various embodiments, the computer programs, when executed, enable the processor 1004 to perform features of the above-described embodiments. Accordingly, such computer programs represent controllers of the computer system 1000.

Software may be stored in a computer program product and loaded into the computing device 1000 using the removable storage drive 1014, the storage drive 1012, or the interface 1040. Alternatively, the computer program product may be downloaded to the computer system 1000 over the communications path 1026. The software, when executed by the processor 1004, causes the computing device 1000 to perform functions of embodiments described herein.

It is to be understood that the embodiment of FIG. 10 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It is to be understood that the embodiment of FIG. 10 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It will be appreciated that the elements illustrated in FIG. 10 function to provide means for performing the computer implemented method as described with respect to FIG. 1. For example, the computing device 1000 provides an apparatus for performing a method for determining a convergence measure for converging an allocation position of a subject allocations provider towards a desired allocation position, the apparatus comprising: at least one processor 1004, at least one memory 1008 including computer program code and at least one communication interface 1024. The interface 1024 may comprise a reader or image capture device.

The at least one memory 1008 and the computer program code are configured to, with at least one processor 1004, cause the apparatus at least to: reading data from a surface of a payment vehicle through the communication interface 1024. The at least one memory 1008 and the computer program code are further configured to cause the at least one processor 1004 decrypt the data, identify a user account, based on the decrypted data, from which funds for the transaction can be debited and complete the transaction using the funds from the user account.

The computing device 1000 of FIG. 10 may execute the process shown in FIG. 11 when the computing device 1000 executes instructions which may be stored in any one or more of the removable storage medium 1044, the removable storage unit 1022 and storage drive 1012. These components 1022, 1044 and 1012 provide a non-transitory computer readable medium having stored thereon executable instructions for controlling a computer to perform steps comprising: a) read data from a surface of a payment vehicle; b) decrypt the data; c) identify a user account, based on the decrypted data, from which funds for the transaction can be debited; and d) complete the transaction using the funds from the user account.

The computing device 1000 of FIG. 10 may also, or alternatively, execute the process shown in FIG. 12 when the computing device 1000 executes instructions which may be stored in any one or more of the removable storage medium 1044, the removable storage unit 1022 and storage drive 1012. These components 1022, 1044 and 1012 provide a non-transitory computer readable medium having stored thereon executable instructions for controlling a computer to perform steps comprising: a) capturing an image; b) forming an encrypted image by encrypting data into the image, the data comprising at least one of a token, payment vehicle details and cardholder details; and c) applying the encrypted image to a payment vehicle body.

Step (b) may involve forming an encrypted image comprises encrypting a first portion of the data and separately encrypting a second portion of the data. Similarly, the encrypting process of Step (b) may include encrypting a first portion of the data and separately encrypting a second portion of the data comprises encrypting the first portion and the second portion using different encryption algorithms.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A payment vehicle for use in initiating a transaction, the payment vehicle comprising:
   a body; and
   an image applied to the body, the image comprising encrypted data,
   wherein the encrypted data is readable by an electronic reader to ascertain account details of a payment vehicle user, thereby to initiate the transaction, and wherein the image is visually comparable to the user, or to information produced by the user, to confirm the user's identity, wherein the image comprises a first portion of information and a second portion of information, and wherein the first portion of information is able to be decrypted by a first process and the second portion of information is able to be decrypted by a second process different from the first process.

2. The payment vehicle of claim 1, wherein the encrypted data comprises information that can be matched to an account of the user, thereby to ascertain the account details of the user for completion of the transaction.

3. The payment vehicle of claim 1, wherein the image comprises a picture of the user's face, the picture enabling visual confirmation of the user's identity by comparison of the face of the user with the picture.

4. The payment vehicle of claim 1, wherein the image is applied to a first side of the body, on which there is no other visually ascertainable information.

5. The payment vehicle of claim 1, wherein the first portion of information is able to be decrypted by using a first decryption key and the second portion of information is able to be decrypted using a second decryption key different from the first decryption key.

6. The payment vehicle of claim 1, consisting of the body and the image.

7. The payment vehicle of claim 1, consisting of the body, the image and a magnetic stripe.

8. The payment vehicle of claim 1, consisting of the body, the image and a near field communication chip.

9. The payment vehicle of claim 1, consisting of the body, the image, a magnetic stripe and a near field communication chip.

10. The payment vehicle of claim 1, wherein the image comprises a picture of the user's signature.

11. A method of performing a transaction, comprising:

reading encrypted data from a surface of a payment vehicle, reading a first portion of data and a second portion of data;

decrypting the first portion of data by a first process and the second portion of data by a second process;

identifying a user account, based on the decrypted data, from which funds for the transaction can be debited; and completing the transaction using the funds from the user account.

12. The method of claim 11, further comprising determining details of at least one of a cardholder and a card issuer from the first portion of data.

13. The method of claim 12, wherein the identifying step comprises using the details to identify a cardholder account in a server system of an issuer.

14. The method of claim 11, wherein the decrypting step comprises decrypting the second portion of data.

15. A method for forming a payment vehicle, comprising:

capturing an image;

forming an encrypted image by encrypting data into the image, the data comprising at least one of a token, payment vehicle details and cardholder details; and applying the encrypted image to a payment vehicle body, wherein encrypting the data into the image comprises using different encryption algorithms to encrypt a first portion of the data and separately encrypt a second portion of the data.

* * * * *